United States Patent
Filatov et al.

(10) Patent No.: US 8,847,451 B2
(45) Date of Patent: Sep. 30, 2014

(54) COMBINATION RADIAL/AXIAL ELECTROMAGNETIC ACTUATOR WITH AN IMPROVED AXIAL FREQUENCY RESPONSE

(75) Inventors: Alexei V. Filatov, Fullerton, CA (US); Lawrence A. Hawkins, Redondo Beach, CA (US)

(73) Assignee: Calnetix Technologies, L.L.C., Cerritos, CA (US)

( * ) Notice: Subject to any disclaimer, the term of this patent is extended or adjusted under 35 U.S.C. 154(b) by 384 days.

(21) Appl. No.: 13/045,379

(22) Filed: Mar. 10, 2011

(65) Prior Publication Data

US 2011/0234033 A1 Sep. 29, 2011

Related U.S. Application Data

(60) Provisional application No. 61/316,765, filed on Mar. 23, 2010.

(51) Int. Cl.
*H02K 7/09* (2006.01)
*F16C 32/04* (2006.01)

(52) U.S. Cl.
CPC ............. *H02K 7/09* (2013.01); *F16C 32/0485* (2013.01); *F16C 32/0465* (2013.01); *H02K 2205/03* (2013.01)
USPC ................ 310/90.5; 310/156.32; 310/156.36; 310/156.37

(58) Field of Classification Search
CPC .................................... H02K 1/12; H02K 7/09
USPC ................. 310/90.5, 156.32, 156.36, 156.37, 310/216.061
See application file for complete search history.

(56) References Cited

U.S. PATENT DOCUMENTS

| | | |
|---|---|---|
| 1,916,256 A | 7/1933 | Chandeysson |
| 2,276,695 A | 3/1942 | Lavarello |
| 2,345,835 A | 4/1944 | Serduke |
| 2,409,857 A | 10/1946 | Hines et al. |
| 2,917,636 A | 12/1959 | Akeley |

(Continued)

FOREIGN PATENT DOCUMENTS

| | | |
|---|---|---|
| DE | 102006004836 A1 | 5/2007 |
| EP | 0774824 | 5/1997 |

(Continued)

OTHER PUBLICATIONS

U.S. Appl. No. 13/116,991, filed May 26, 2011, Filatov.

(Continued)

*Primary Examiner* — Terrance Kenerly
(74) *Attorney, Agent, or Firm* — Fish & Richardson P.C.

(57) ABSTRACT

A first bias magnetic flux may be communicated between a first axial pole and a first axial facing surface of the body. A second bias magnetic flux may be communicated between a second axial pole and a second axial facing surface of the body. A time-varying axial control magnetic flux may be communicated through the first and second axial facing surfaces of the body, and may be generated in a magnetic circuit including the body, the first and second axial poles, and an axial magnetic backiron. The first and second axial poles may include axial pole laminated inserts composed of electrically isolated steel laminations stacked along the body axis. The axial magnetic backiron may include laminated inserts composed of electrically isolated steel laminations stacked in the direction tangential to the body axis. The axial pole laminated inserts may be magnetically coupled to the axial magnetic backiron laminated inserts.

33 Claims, 12 Drawing Sheets

(56) References Cited

U.S. PATENT DOCUMENTS

| | | | |
|---|---|---|---|
| 3,060,335 A | 10/1962 | Greenwald | |
| 3,064,942 A | 11/1962 | Martin | |
| 3,243,692 A | 3/1966 | Heissmeier et al. | |
| 3,439,201 A | 4/1969 | Levy et al. | |
| 3,943,443 A | 3/1976 | Kimura et al. | |
| 4,093,917 A | 6/1978 | Haeussermann | |
| 4,127,786 A | 11/1978 | Volkrodt | |
| 4,170,435 A | 10/1979 | Swearingen | |
| 4,260,914 A | 4/1981 | Hertrich | |
| 4,358,697 A | 11/1982 | Liu et al. | |
| 4,362,020 A | 12/1982 | Meacher et al. | |
| 4,415,024 A | 11/1983 | Baker | |
| 4,535,289 A | 8/1985 | Abe et al. | |
| 4,560,928 A | 12/1985 | Hayward | |
| 4,635,712 A | 1/1987 | Baker et al. | |
| 4,639,665 A | 1/1987 | Gary | |
| 4,642,501 A | 2/1987 | Kral et al. | |
| 4,659,969 A | 4/1987 | Stupak | |
| 4,731,579 A | 3/1988 | Petersen et al. | |
| 4,740,711 A | 4/1988 | Sato et al. | |
| 4,806,813 A | 2/1989 | Sumi et al. | |
| 4,920,291 A * | 4/1990 | McSparran | 310/90.5 |
| 4,948,348 A | 8/1990 | Doll et al. | |
| 5,003,211 A | 3/1991 | Groom | |
| 5,083,040 A | 1/1992 | Whitford et al. | |
| 5,115,192 A | 5/1992 | Bardas et al. | |
| 5,241,425 A | 8/1993 | Sakamoto et al. | |
| 5,315,197 A | 5/1994 | Meeks et al. | |
| 5,481,145 A | 1/1996 | Canders et al. | |
| 5,514,924 A | 5/1996 | McMullen et al. | |
| 5,559,379 A | 9/1996 | Voss | |
| 5,589,262 A | 12/1996 | Kiuchi et al. | |
| 5,627,420 A | 5/1997 | Rinker et al. | |
| 5,672,047 A | 9/1997 | Birkholz | |
| 5,739,606 A | 4/1998 | Takahata et al. | |
| 5,767,597 A | 6/1998 | Gondhalekar | |
| 5,831,431 A | 11/1998 | Gottfried-Gottfried et al. | |
| 5,939,879 A | 8/1999 | Wingate et al. | |
| 5,942,829 A | 8/1999 | Huynh | |
| 5,994,804 A | 11/1999 | Grennan et al. | |
| 6,087,744 A | 7/2000 | Glauning | |
| 6,130,494 A | 10/2000 | Schöb | |
| 6,148,967 A | 11/2000 | Huynh | |
| 6,167,703 B1 | 1/2001 | Rumez et al. | |
| 6,191,511 B1 | 2/2001 | Zysset | |
| 6,259,179 B1 | 7/2001 | Fukuyama et al. | |
| 6,268,673 B1 | 7/2001 | Shah et al. | |
| 6,270,309 B1 | 8/2001 | Ghetzler et al. | |
| 6,304,015 B1 | 10/2001 | Filatov et al. | |
| 6,313,555 B1 | 11/2001 | Blumenstock et al. | |
| 6,325,142 B1 | 12/2001 | Bosley et al. | |
| 6,359,357 B1 | 3/2002 | Blumenstock | |
| 6,437,468 B2 | 8/2002 | Stahl et al. | |
| 6,465,924 B1 | 10/2002 | Maejima | |
| 6,664,680 B1 | 12/2003 | Gabrys | |
| 6,700,258 B2 | 3/2004 | McMullen et al. | |
| 6,727,617 B2 | 4/2004 | McMullen et al. | |
| 6,794,780 B2 | 9/2004 | Silber et al. | |
| 6,856,062 B2 | 2/2005 | Heiberger et al. | |
| 6,876,194 B2 | 4/2005 | Lin et al. | |
| 6,885,121 B2 | 4/2005 | Okada et al. | |
| 6,897,587 B1 | 5/2005 | McMullen et al. | |
| 6,925,893 B2 | 8/2005 | Abe et al. | |
| 6,933,644 B2 | 8/2005 | Kanebako | |
| 7,042,118 B2 | 5/2006 | McMullen et al. | |
| 7,135,857 B2 | 11/2006 | Johnson | |
| 7,557,480 B2 * | 7/2009 | Filatov | 310/90.5 |
| 7,635,937 B2 | 12/2009 | Brunet et al. | |
| 8,102,088 B2 * | 1/2012 | Filatov | 310/90.5 |
| 8,169,118 B2 | 5/2012 | Filatov | |
| 2001/0017500 A1 | 8/2001 | Hirama et al. | |
| 2001/0030471 A1 | 10/2001 | Kanebako | |
| 2002/0006013 A1 | 1/2002 | Sato et al. | |
| 2002/0175578 A1 | 11/2002 | McMullen et al. | |
| 2003/0155829 A1 | 8/2003 | McMullen et al. | |
| 2003/0197440 A1 * | 10/2003 | Hasegawa et al. | 310/90.5 |
| 2005/0093391 A1 | 5/2005 | McMullen et al. | |
| 2007/0056285 A1 | 3/2007 | Brewington | |
| 2007/0063594 A1 | 3/2007 | Huynh | |
| 2007/0164627 A1 * | 7/2007 | Brunet et al. | 310/90.5 |
| 2007/0200438 A1 | 8/2007 | Kaminski et al. | |
| 2007/0296294 A1 | 12/2007 | Nobe et al. | |
| 2008/0211355 A1 | 9/2008 | Sakamoto et al. | |
| 2008/0246373 A1 * | 10/2008 | Filatov | 310/68 B |
| 2008/0252078 A1 | 10/2008 | Myers | |
| 2009/0004032 A1 | 1/2009 | Kaupert | |
| 2009/0201111 A1 * | 8/2009 | Filatov | 335/209 |
| 2009/0295244 A1 * | 12/2009 | Ries | 310/90.5 |
| 2010/0007225 A1 * | 1/2010 | Platon et al. | 310/45 |
| 2010/0090556 A1 | 4/2010 | Filatov | |
| 2010/0117627 A1 | 5/2010 | Filatov | |
| 2010/0301840 A1 * | 12/2010 | Filatov | 324/207.11 |
| 2011/0101905 A1 | 5/2011 | Filatov | |
| 2011/0163622 A1 | 7/2011 | Filatov et al. | |

FOREIGN PATENT DOCUMENTS

| | | |
|---|---|---|
| EP | 1905948 | 4/2008 |
| GB | 2225813 | 6/1990 |
| JP | 63277443 | 11/1988 |
| JP | 2006136062 A | 5/2006 |

OTHER PUBLICATIONS

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Turboden—Organic Rankine Cycle, "Turboden High Efficiency Rankine for Renewable Energy and Heat Recovery," (2 pages), available at http://www.turboden.it/orc.asp, 1999-2003. printed Jul. 27, 2006.

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.

Honeywell, "Genetron® 245fa Applications Development Guide," (15 pages), 2000.

Hawkins, Lawrence A. et al., "*Analysis and Testing of a Magnetic Bearing Energy Storage Flywheel with Gain-Scheduled, Mimo Control,*" Proceedings of ASME Turboexpo 2000, Munich, Germany, May 8-11, 2000, pp. 1-8.

McMullen, Patrick T. et al., "*Combination Radial-Axial Magnetic Bearing,*" Seventh International Symposium on Magnetic Bearings, ETH Zurich, Aug. 23-25, 2000, pp. 473-478.

Hawkins, Lawrence et al., "*Shock and Vibration Testing of an AMB Supported Energy Storage Flywheel,*" 8th International Symposium on Magnetic Bearings, Mito, Japan, Aug. 26-28, 2002, 6 pages.

McMullen, Patrick T. et al., "*Design and Development of a 100 KW Energy Storage Flywheel for UPS and Power Conditioning Applications,*" 24th International PCIM Conference, Nuremberg, Germany, May 20-22, 2003, 6 pages.

Hawkins, Larry et al., "*Development of an AMB Energy Storage Flywheel for Industrial Applications,*" 7th International Symposium on Magnetic Suspension Technology, Fukoka, Japan, Oct. 2003, 5 pages.

Freepower FP6,. "Freepower FP6 Specification & Dimensions for 6kWe Electricity Generating Equipment," (2 pages), 2000-2004, printed Jul. 26, 2006.

Hawkins, Larry et al., "*Development of an AMB Energy Storage Flywheel for Commercial Application,*" International Symposium on Magnetic Suspension Technology, Dresden, Germany, Sep. 2005, 5 pages.

Freepower ORC Electricity Company with Industrial Processes, "Industrial Processes," (1 page), available at http://www.freepower.co.uk/site-5.htm, 2000-2006, printed Jul. 26, 2006.

Freepower ORC Electricity Company FP6 Product Description, "FP6," (1 page), available at http://www.freepower.co.uk/fp6.htm, 2000-2006, printed Jul. 26, 2006.

(56) References Cited

OTHER PUBLICATIONS

Freepower ORC Electricity Company FP120 Product Description, "FP120," (1 page), available at http://www.freepower.co.uk/fp120.htm, 2000-2006, printed Jul. 26, 2006.
Freepower ORC Electricity Company FP60 Product Description, "FP60," (1 page), available at http://www.freepower.co.uk/fp60.htm, 2000-2006, printed Jul. 26, 2006.
Freepower ORC Electricity Company Products Technical Overview "A System Overview," (1 page), available at http://www.freepower.co.uk/tech-overview.htm, 2000-2006, printed Jul. 26, 2006.
Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.
Huynh, Co et al., "*Flywheel Energy Storage System for Naval Applications*," GT 2006-90270, Proceedings of GT 2006 ASME Turbo Expo 2006: Power for Land, Sea & Air, Barcelona, Spain, May 8-11, 2006, pp. 1-9.
Freepower ORC Electricity Company Home Page, "Welcome to Freepower," (1 page) available at http://www.freepower.co.uk/, Jul. 18, 2006.
PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.
Ormat Web Site: "Recovered Energy Generation in the Cement Industry," (2 pages) available at http://www.ormat.com/technology_cement_2.htm, printed Jul. 26, 2006.
McMullen, Patrick et al., "*Flywheel Energy Storage System with AMB's and Hybrid Backup Bearings*," Tenth International Symposium on Magnetic Bearings, Martigny, Switzerland, Aug. 21-23, 2006, 6 pages.
International Search Report and Written Opinion of the International Searching Authority issued in International Application No. PCT/US2009/031837 on Sep. 7, 2009; 11 pages.
International Preliminary Report on Patentability issued in International Application No. PCT/US2009/031837 on Jul. 27, 2010, 6 pages.
International Search Report and Written Opinion of the International Searching Authority issued in International Application No. PCT/US2009/058816, mailed Jun. 10, 2010, 10 pages.
International Preliminary Report on Patentability issued in International Application No. PCT/US2009/058816 on Apr. 12, 2011, 5 pages.
Meeks, Crawford, "*Development of a Compact, Lightweight Magnetic Bearing*," 26th Annual AIAA/SAE/ASME/ASEE Joint Propulsion Conference, Jul. 16-18, 1990, 9 pages.
Ehmann et al., "*Comparison of Active Magnetic Bearings With and Without Permanent Magnet Bias*," Ninth International Symposium on Magnetic Bearings, Lexington, Kentucky, Aug. 3-6, 2004, 6 pages.
Office Action issued in U.S. Appl. No. 12/267,517 on Mar. 28, 2011, 9 pages.
Office Action issued in U.S. Appl. No. 12/569,559 on Apr. 25, 2011, 22 pages.
Notice of Allowance issued in U.S. Appl. No. 12/569,559 on Aug. 9, 2011, 9 pages.
Notice of Allowance issued in U.S. Appl. No. 12/358,172 on Sep. 20, 2011, 10 pages.
U.S. Appl. No. 12/985,911, filed Jan. 6, 2011, Filatov et al.
Notice of Allowance issued in U.S. Appl. No. 12/569,559 on Jan. 27, 2012, 6 pages.
Request for Continued Examination filed in U.S. Appl. No. 12/569,559 on Nov. 9, 2011, 13 pages.
Notice of Allowance issued in U.S. Appl. No. 12/267,517 on Feb. 21, 2012, 7 pages.
Amendment filed in U.S. Appl. No. 12/267,517 on Jan. 31, 2012, 9 pages.
Office Action issued in U.S. Appl. No. 12/475,052 on Jun. 19, 2012, 9 pages.
Office Action issued in U.S. Appl. No. 12/475,052 on Sep. 12, 2012, 8 pages.
Notice of Allowance issued in U.S. Appl. No. 12/610,766, on Oct. 19, 2012; 7 pages.
Office Action issued in U.S. Appl. No. 13/116,991 on Oct. 26, 2012; 13 pages.
Amendment filed in U.S. Appl. No. 12/475,052 on Dec. 12, 2012, 13 pages.
Sortore, Christopher K. et al., "Design of Permanent Magnet Biased Magnetic Bearings for a Flexible Rotor" Presentation at the 44th MFPG Meeting, Virginia Beach, VA, Apr. 2-5, 1990 (10 pages).
Notice of Allowance issued in U.S. Appl. No. 13/116,991 on Mar. 7, 2013, 7 pages.
Office Action issued in U.S. Appl. No. 12/985,211 on Jul. 5, 2013, 16 pages.

\* cited by examiner

COMBINATION RADIAL/AXIAL ELECTROMAGNETIC ACTUATOR WITH AN IMPROVED AXIAL FREQUENCY RESPONSE

CLAIM OF PRIORITY

This application claims priority under 35 U.S.C. §119 to U.S. Provisional Patent Application Ser. No. 61/316,765, filed on Mar. 23, 2010, the entire contents of which are hereby incorporated by reference.

TECHNICAL FIELD

This disclosure relates to generating electromagnetic forces, and, more particularly, to generating radial and axial electromagnetic forces using a combination radial/axial electromagnetic actuator.

BACKGROUND

Equipment and machinery often contain moving (e.g., rotating, translating) members, which require support during operation. A bearing, or similar device, may be used to support the moving member. Although some bearings may require direct contact with the member to provide the necessary support, some applications benefit from non-contact, or nearly non-contact, support for the member. A magnetic bearing uses an electromagnetic actuator to apply a controlled electromagnetic force to support the moving member in a non-contact, or nearly non-contact, manner. The non-contact or nearly non-contact support provided by the magnetic bearing can provide frictionless or nearly frictionless movement of the member in both the axial and radial directions.

SUMMARY

In some embodiments, an electromagnetic actuator may include a body having a rotational axis. A first axial pole may reside apart from the body, the first axial pole adjacent a first end facing surface of the body and adapted to communicate magnetic flux across a gap with the first end facing surface of the body. A second axial pole may reside apart from the body, the second axial pole adjacent a second end facing surface of the body and adapted to communicate magnetic flux with the second end facing surface of the body. A lamination stack may include electrically isolated steel laminations. An axial backiron, the first axial pole, the second axial pole, and the lamination stack may be magnetically linked and define an axial magnetic control circuit. A first radial pole may reside apart from the body, the first radial pole adjacent a lateral facing surface of the body and adapted to communicate a magnetic flux with the lateral facing surface of the body and at least one of the first axial pole or the second axial pole. The body, the first radial pole, and one of the first axial pole or the second axial pole may define a magnetic bias circuit.

At least one lamination stack may be rigidly affixed to one of the first axial pole or the second axial pole, the lamination stack comprising electrically isolated steel laminations stacked in a direction parallel or substantially parallel to the rotational axis. The term "substantially parallel" includes the parallel orientation as well as orientations that are slightly off of the parallel direction with respect to the rotational axis of the body.

At least one lamination stack may be rigidly affixed to the axial backiron and the electrically isolated steel laminations may be stacked in a direction substantially orthogonal to the rotational axis. The term "substantially orthogonal" includes the orthogonal direction and directions that are slightly off the orthogonal relative to the rotational axis.

In certain implementations, a second radial pole may be adjacent a lateral facing surface of the body and adapted to communicate a magnetic flux with the lateral facing surface of the body, the first radial pole and at least one of the first axial pole or the second axial pole. The body, the second radial pole, and the first axial pole or the second axial pole may define a magnetic bias circuit. The body, the first radial pole, and the second radial pole may define a radial magnetic control circuit.

In certain implementations, the end facing surface of the body may be substantially orthogonal to the rotational axis. The term substantially orthogonal is meant to include orientations that are orthogonal or normal to the rotational axis, as well as orientations that are slightly off of the normal to the rotational axis.

In certain implementations, the body may incorporate a magnetically permeable actuator target, the actuator target adapted to communicate a magnetic flux.

In certain implementations, a magnetic element may be configured to produce magnetic bias flux in the magnetic bias circuit.

In certain implementations, an axial coil may be adapted to produce a magnetic flux in the axial magnetic control circuit.

In certain implementations, a radial coil may be adapted to produce a magnetic flux in the radial magnetic control circuit.

In certain implementations, the magnetic flux entering the end facing surface of the body exerts an axial force on the body.

In certain implementations, the magnetic fluxes entering the lateral surface of the body exert radial forces on the body.

In certain implementations, the axial force is proportional to the magnetic flux in the axial magnetic control circuit.

In certain implementations, the radial forces are proportional to the magnetic fluxes in the radial magnetic control circuits.

In certain implementations, the lamination stack includes a first annular lamination and a second annular lamination, the first and second annular laminations defining an annular lamination stack coaxial to the rotational axis.

In certain implementations, the first annular lamination is a first disjointed annular element defining a first air gap between disjoined segments of the annular element and the second annular lamination is a second disjointed annular element defining a second air gap between disjoined segments of the second annular element.

In certain implementations, the first air gap resides misaligned from the second air gap in the annular lamination stack.

In certain implementations, the first axial pole includes a first segment and a second segment.

In certain implementations, the first segment and the second segment are electrically isolated from each other.

In certain implementations, the first segment includes a first lamination segment and a second lamination segment, the first and second lamination segment defining a lamination stack.

In certain implementations, the first lamination segment and the second lamination segment are electrically isolated from each other.

In some embodiments, a method for exerting a time-varying force on a body along a body axis may include communicating a first bias magnetic flux through a first axial facing surface of the body. The method may also include communicating a second bias magnetic flux through a second axial facing surface of the body. In addition, a time-varying axial control magnetic flux may be generated and directed towards the first and the second axial facing surfaces of the body in a stationary magnetic control circuit, the stationary magnetic control circuit including at least one electrically isolated steel lamination stack stacked in a direction substantially orthogonal to the control magnetic flux.

In some embodiments, an electric machine system may include a stator and a rotor. The rotor may have a rotational axis configured to move relative to the stator. The electric machine may also include an electromagnetic actuator subassembly that may include a cylindrical actuator target rigidly mounted on the rotor. A first axial pole may reside apart from the actuator target, the first axial pole adjacent a first end facing surface of the actuator target and adapted to communicate magnetic flux across a gap with the first end facing surface of the actuator target. A second axial pole may reside apart from the body, the second axial pole adjacent a second end facing surface of the body and adapted to communicate magnetic flux with the second end facing surface of the body. An axial backiron may magnetically link the first axial pole and the second axial pole. A lamination stack may include electrically isolated steel laminations. The body, the first axial pole, the second axial pole, the lamination stack, and the axial backiron may be magnetically linked and define an axial magnetic control circuit. An axial control conductive coil may be adapted to produce a magnetic flux in the axial magnetic control circuit A plurality of radial poles may reside apart from the body, the plurality of radial poles adjacent a lateral facing surface of the body and adapted to communicate magnetic fluxes with the lateral facing surface of the body. The body and the plurality of radial poles define a plurality of radial magnetic control circuits, and the plurality of radial poles may be adapted to communicate magnetic fluxes with the lateral facing surface of the body and at least one of the first axial pole or the second axial pole. The body, the plurality of radial poles, and at least one of the first axial pole or the second axial pole define a magnetic bias circuit. Radial control conductive coils may be wound around the radial poles and adapted to produce a magnetic flux in the radial magnetic control circuit. One or more position sensors may be configured to sense a position of the body. At least one control electronics package may be configured to control the magnetic fluxes in the axial magnetic control circuit and the radial magnetic control circuits.

In certain implementations, the body is coupled to a driven load, the driven load comprising at least one of a flywheel, a compressor, a generator, or an expander.

In certain implementations, the body is coupled to a driver, the driver comprising at least one of a motor, an engine, or a turbine.

In certain implementations, the electronic control package is configured to control the magnetic fluxes in the radial magnetic control circuits by energizing the control coil around each of the plurality of radial poles with a control current.

In certain implementations, the electronic control package is further configured to energize the axial and radial control conductive coil with control currents in response to changes of signals from the position sensors so that the rotor is supported by electromagnetic forces without a mechanical contact with the stator.

The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure relates to generating electromagnetic forces through an electromagnetic actuator and, more particularly, to generating radial and axial electromagnetic forces through a combination radial/axial electromagnetic actuator with an improved axial frequency response.

In certain instances, Permanent-Magnet-Biased Homopolar Combination Axial/Radial Electromagnetic Actuators offer advantages of small part count, small size and weight, and short axial length. One of the important applications of such an actuator is in Active Magnetic Bearings (AMBs) providing non-contact support of objects using electromagnetic forces. In particular, when an AMB system is used in rotating machinery, the combination actuator may improve rotordynamic response due to a more compact design than a combination of separate radial and axial actuators. However, the axial channel of a combination actuator may exhibit lower bandwidth characteristics as compared to a dedicated axial actuator. This may complicate the axial control of an AMB system and degrades its performance. In combination axial/radial actuators, the axial bandwidth limitation may be caused by eddy currents induced in the components of the axial magnetic control circuit, which are made metallic for practical reasons, when an alternating axial control current is applied. These currents result in both amplitude attenuation and a phase lag of the magnetic control flux, which subsequently affect the control force. Because in combination actuators the axial magnetic control circuit is significantly longer than in conventional dedicated axial electromagnetic actuators, it may result in larger amplitude attenuations and phase lags.

Figure 1:
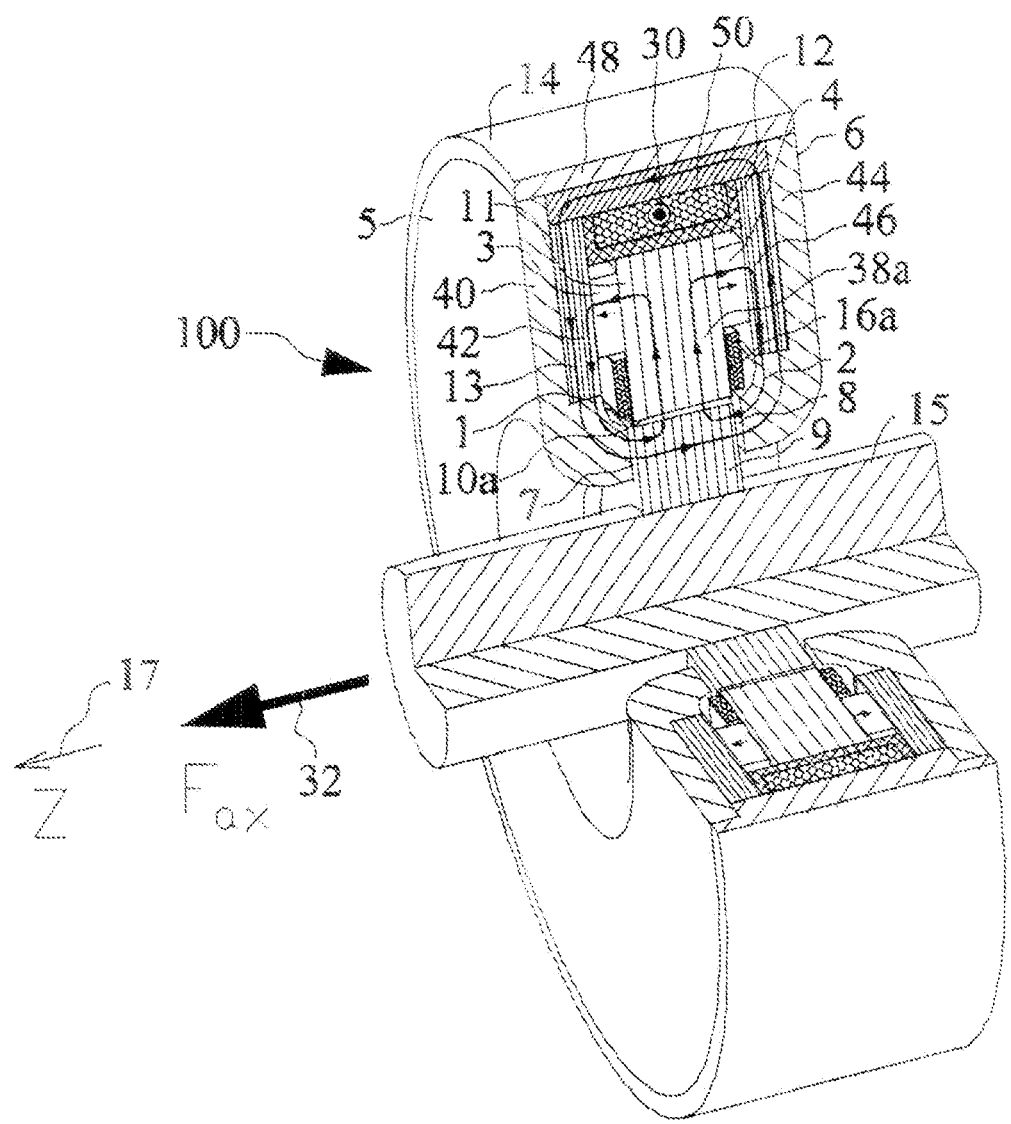
FIG. 1 shows a perspective partial cross-sectional view of an electromagnetic actuator in accordance with the present disclosure and illustrates generating an axial force.

FIG. 1 shows a partial cross-sectional view of an electromagnetic actuator 100 in accordance with the present disclosure and illustrates generating an axial force 32. Bias magnetic flux 1, generated by permanent magnet 3, is directed by axial pole 5 to axial gap 7. The axial pole 5 may consist of a solid-steel portion 40 and a laminated axial pole insert 42 composed of electrically insulated electrical steel laminations stacked in the axial direction Z 17. The bias flux 1 then passes through axial gap 7 and enters the actuator target 9. Likewise, magnetic bias flux 2, generated by permanent magnet 4, is directed by axial pole 6 to axial gap 8. The axial pole 6 may consist of a solid-steel portion 44 and a laminated axial pole insert 46 composed of electrically insulated electrical steel laminations stacked in the axial direction Z 17. The bias flux 2 then passes through axial gap 8 and enters the actuator target 9. Bias fluxes 1 and 2 merge together and exit through the radial gaps 10a through 10d (shown in FIG. 3) into the radial actuator pole assembly 11.

The electrically insulated electrical steel lamination inserts 42 and 46 may be imbedded into the axial poles 5 and 6, respectively. The lamination inserts 42 and 46 may be implanted into axial poles 5 and 6, respectively, or may be attached mechanically to the axial poles 5 and 6 or to magnets 3 and 4, respectively. The term imbedded may include different ways of integrating, inserting, attaching, affixing, or otherwise establishing a connection such that the a magnetic flux can be communicated between the magnets 3 and 4, the first pole and second pole 5 and 6, respectively, and the laminations 42 and 46, respectively.

Figure 2:
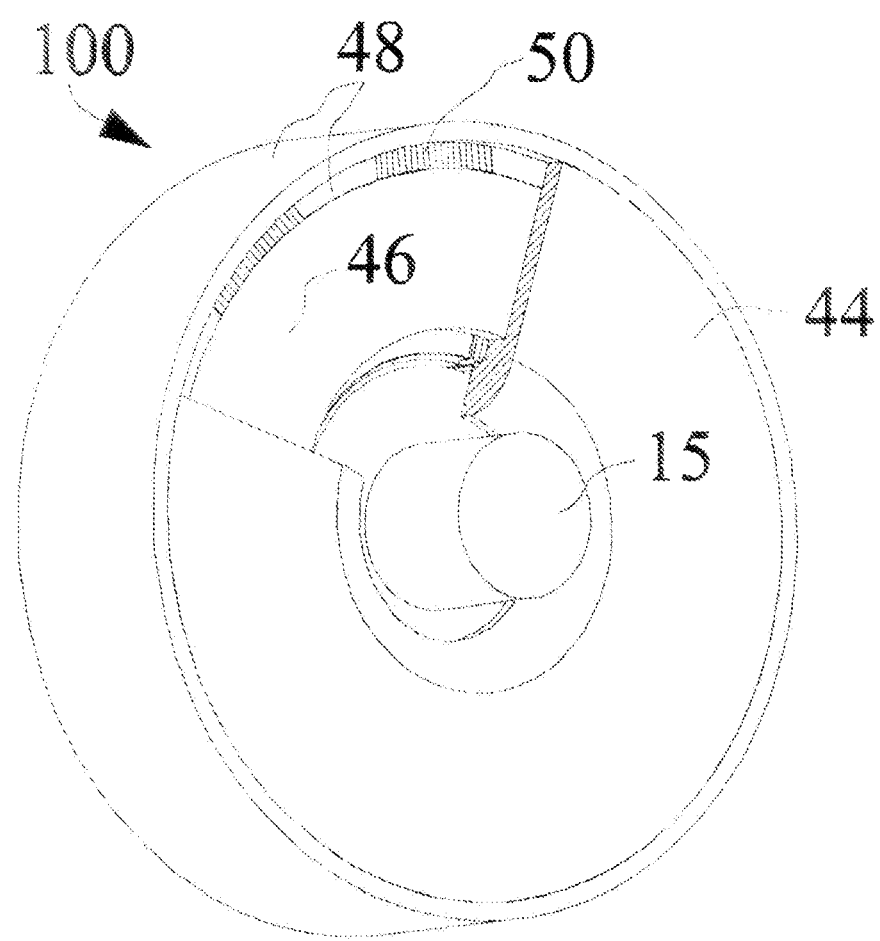
FIG. 2 shows a perspective view of an electromagnetic actuator in accordance with the present disclosure with a portion of an axial pole cut out to reveal the laminated axial backiron inserts.

The coil 12 carries axial control current 30 flowing around the actuator axis 17. This current 30 produces magnetic axial control flux 13, which may propagate through axial pole 5, axial gap 7, actuator target 9, axial gap 8, axial pole 6, and axial backiron 14. The axial backiron 14 may consist of a solid steel portion 48 and laminated axial backiron inserts 50 composed of electrically insulated electrical steel laminations stacked in a tangential direction with respect to the actuator axis 17. FIG. 2 shows the actuator 100 with a quarter of the solid portion 44 of the axial pole 6 cut out to reveal details of how the laminated axial backiron inserts 50 may be inserted into slots in the solid portion 48 of the axial backiron 14. The axial backiron inserts 50 may be imbedded into the axial backiron 14. The axial backiron inserts 50 may otherwise be affixed to the axial backiron such that magnetic flux can be communicated between the axial backiron 14 and the axial backiron inserts 50. The axial backiron inserts 50 may be lamination stacks stacked in a direction orthogonal or substantially orthogonal to the rotational axis of the actuator target 9.

The magnitude and direction of the magnetic axial control flux 13 can be changed by changing the current 30 in the coil 12. If the magnetic axial control flux 13 is zero, the bias flux 1 in the axial gap 7 may be equal or near equal to the bias flux 2 in the axial gap 8 and the net axial electromagnetic force acting on the actuator target 9 may offset towards a zero or near zero net value. If there is a non-zero magnetic axial control flux 13 flowing in the direction shown in FIG. 1, the magnetic axial control flux 13 adds to the bias flux 1 in the axial gap 7, but subtracts from the bias flux 2 in the axial gap 8. Because of the differences in the flux densities on the actuator target sides facing gaps 7 and 8, there may be an axial force $F_{ax}$ 32 directed along the Z-axis 17 towards the axial pole 5 (positive Z-direction). Reversing direction of the current 30 in the control coil 12 reverses the direction of the force $F_{ax}$ 32. Since the actuator target 9 is rigidly mounted on the machine shaft 15, all the forces exerted on it may be directly transferred to the shaft 15.

Figure 3:
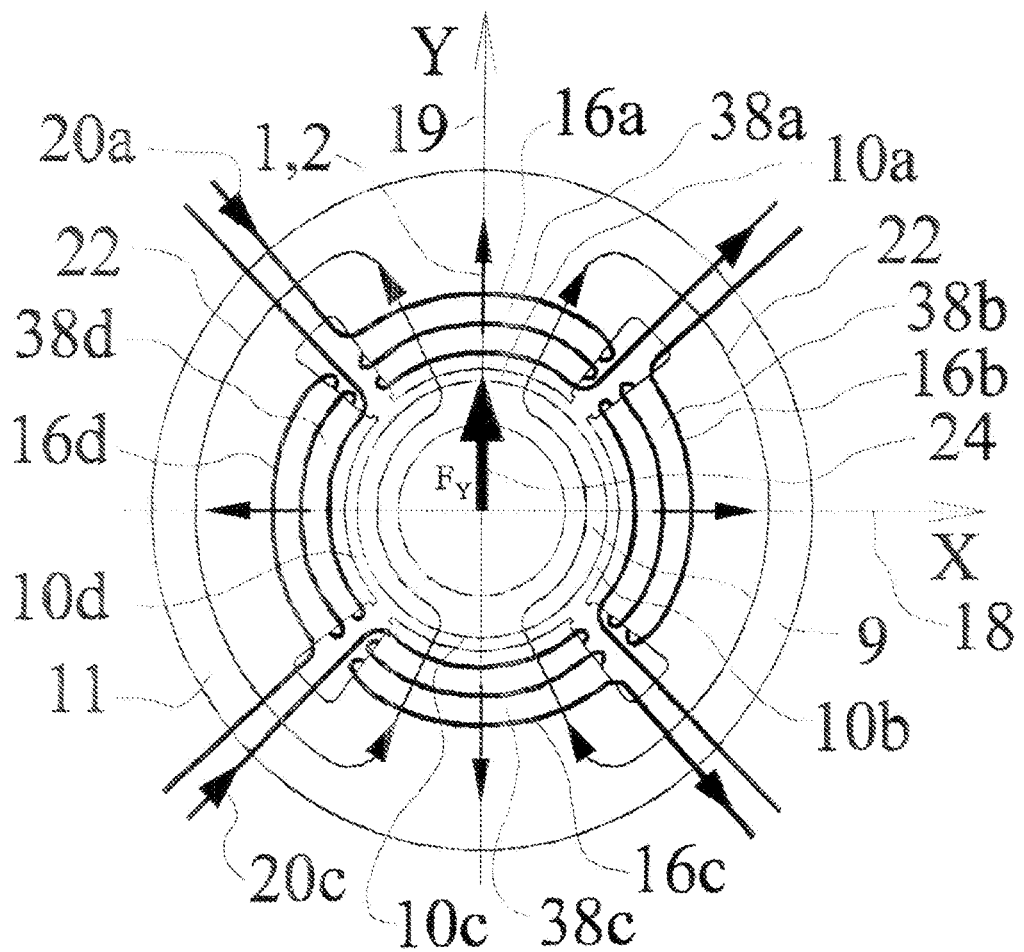
FIG. 3 shows an axial cross-sectional view of an electromagnetic actuator in accordance with the present disclosure and illustrates generating a radial force.

The magnetic actuator 100 may also provide radial forces on the same actuator target 9. The mechanism of the radial force generation is explained in FIG. 3. FIG. 3 shows an axial sectional view of an electromagnetic actuator in accordance with the present disclosure and illustrates generating a radial force. To produce radial forces in multiple (or all) directions within a radial plane, the radial pole assembly 11 is equipped with at least three radial control poles and control windings around these poles. For example, FIG. 3 shows four radial control windings 16a through 16d located in slots between the poles 38a-38d. The bias fluxes 1 and 2 generated by the magnets 3 and 4 add up in the radial air gaps 10a through 10d and flow radially within the radial poles 38a-38d. When the target 9 is in the central position and there are no currents in windings 16a through 16d, the bias flux density under each pole associated with windings 16a-16d is the same or similar because of the system symmetry. Therefore, the net radial force may approach zero or close to zero. By energizing the radial control coils 16a-16d, the flux distribution can be altered so that a radial force would develop. For example, FIG. 3 shows coils 16a and 16c being energized with control currents 20a and 20c, respectively. These currents produce radial control flux 22. In the air gap 10a under the pole 38a associated with the control coil 16a, control flux 22 adds to the combined bias fluxes 1 and 2, while in the air gap 10c under the pole associated with the control coil 16c, it subtracts. Since the flux density will be higher at the top of the target 9 than at the bottom, there will be a radial force $F_Y$ 24 acting on the target, directed along the Y-axis 19 upwards in FIG. 3 (e.g., positive Y-direction). Similarly, by energizing windings 16b and 16d, a force can be produced in the direction of the X-axis 18.

It is to be noticed that the proposed electromagnetic actuator may also be used to produce only the axial force 32 without the capability of producing radial forces. In this case, the radial control windings 16a through 16d shown in FIG. 3 may be omitted, as well as the slots between the poles 38a through 38d accommodating these windings.

For practical reasons, the radial actuator pole assembly 11 and the actuator target 9 may be assembled of magnetically permeable and electrically conductive laminations (e.g., steel laminations) stacked axially and electrically isolated from each other. The isolation reduces eddy currents in these components induced when the radial control windings 16a-16d are energized with time-varying currents to produce time-varying radial forces.

Figure 4:
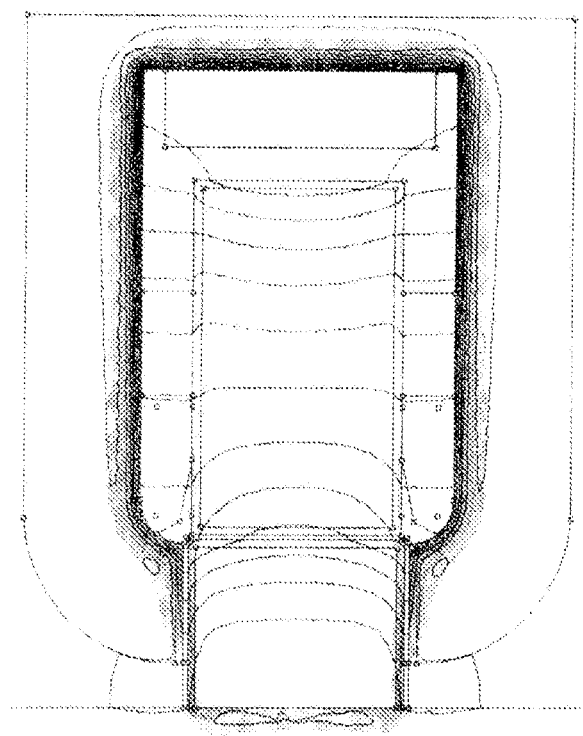
FIG. 4 shows a radial cross-sectional view of a combination radial/axial electromagnetic actuator and illustrates a distribution of an AC magnetic control flux without laminated axial pole inserts and laminated axial backiron inserts.

Similarly, the laminated axial pole inserts 42 and 46 and the laminated axial backiron inserts 50 serve to reduce effects of eddy currents which could be otherwise induced in the axial poles 5 and 6 and axial backiron 14 when the axial control coil 12 is energized with a time-varying current 30 to produce a time-varying axial force $F_z$ 32. One of the consequences of having these eddy currents would be having an axial magnetic control flux 13 constrained to thin layers adjacent to the inner surfaces of the axial poles 5, 6 and the axial backiron 14 as illustrated in FIG. 4. This is a manifestation of a physical phenomenon commonly referred to as a "skin-effect," which postulates that due to the presence of eddy currents, AC magnetic fields are expelled from interiors of conductive objects into thin layers adjacent to the object surfaces. When a frequency of the current 30 and, consequently, a frequency of the magnetic axial control flux 13 increase, the eddy currents become stronger, and the surface layers available to the magnetic axial control flux 13 become thinner. This results in a reduction of the magnitude of the axial force 32 with frequency even if the control current 30 is maintained at the same level. Moreover, eddy-currents cause a phase lag between the axial force 32 and the control current 30, which becomes larger when the frequency increases. All these factors make using an electromagnetic actuator more difficult.

Figure 5:
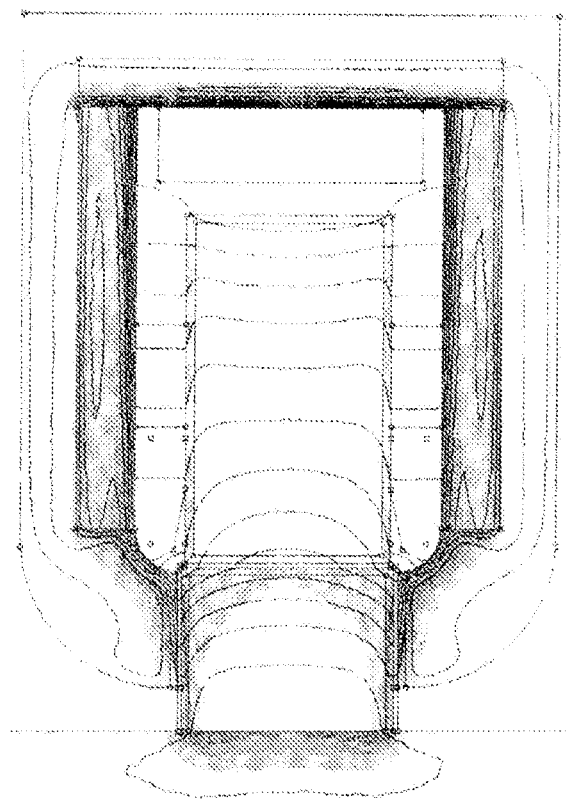
FIG. 5 shows a radial cross-sectional view of a combination radial/axial electromagnetic actuator according to the present disclosure and illustrates a distribution of an AC magnetic control flux with laminated axial pole inserts and laminated axial backiron inserts.
Figure 6:
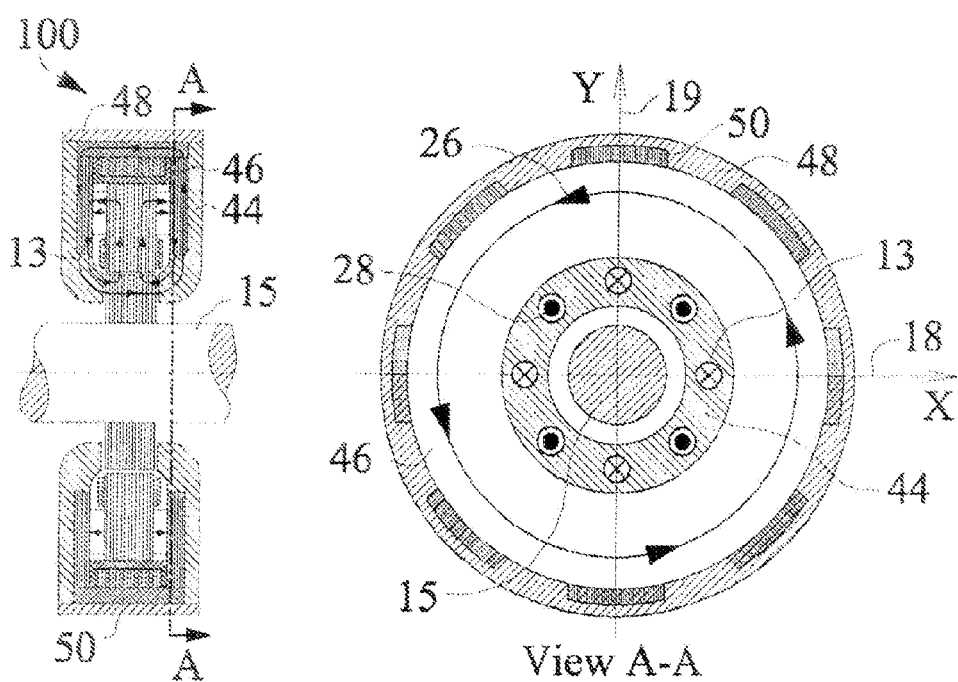
FIG. 6 shows views of an electromagnetic actuator according to the present disclosure and illustrates induction of a circular current in a laminated axial pole insert when producing a time-varying axial control force.
Figure 7:
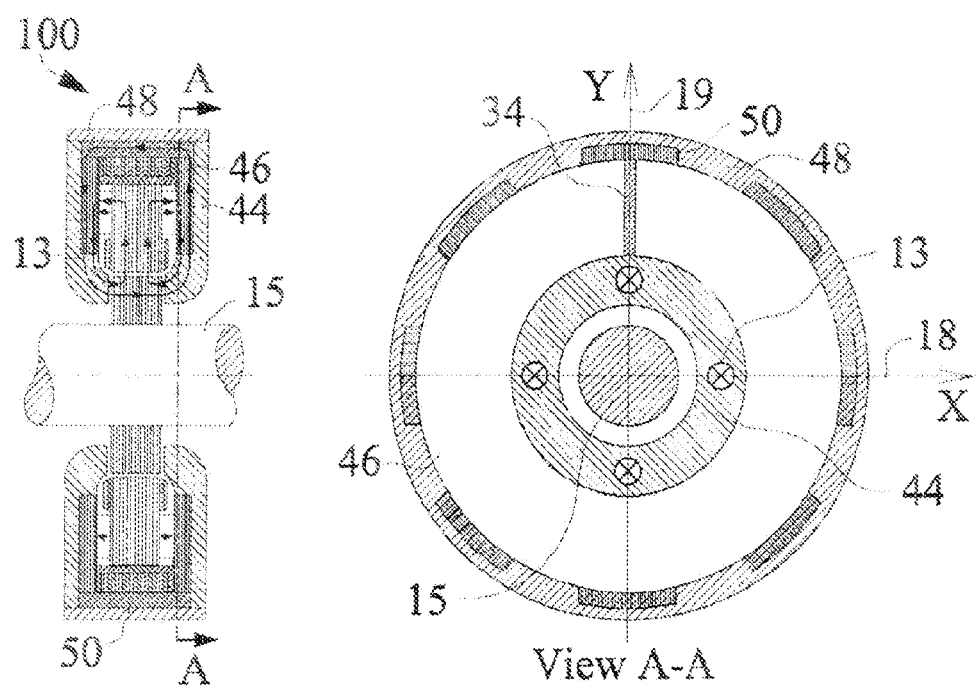
FIG. 7 shows views of an electromagnetic actuator according to the present disclosure and illustrates a manner of preventing a circular current in the laminated axial pole insert.
Figure 8:
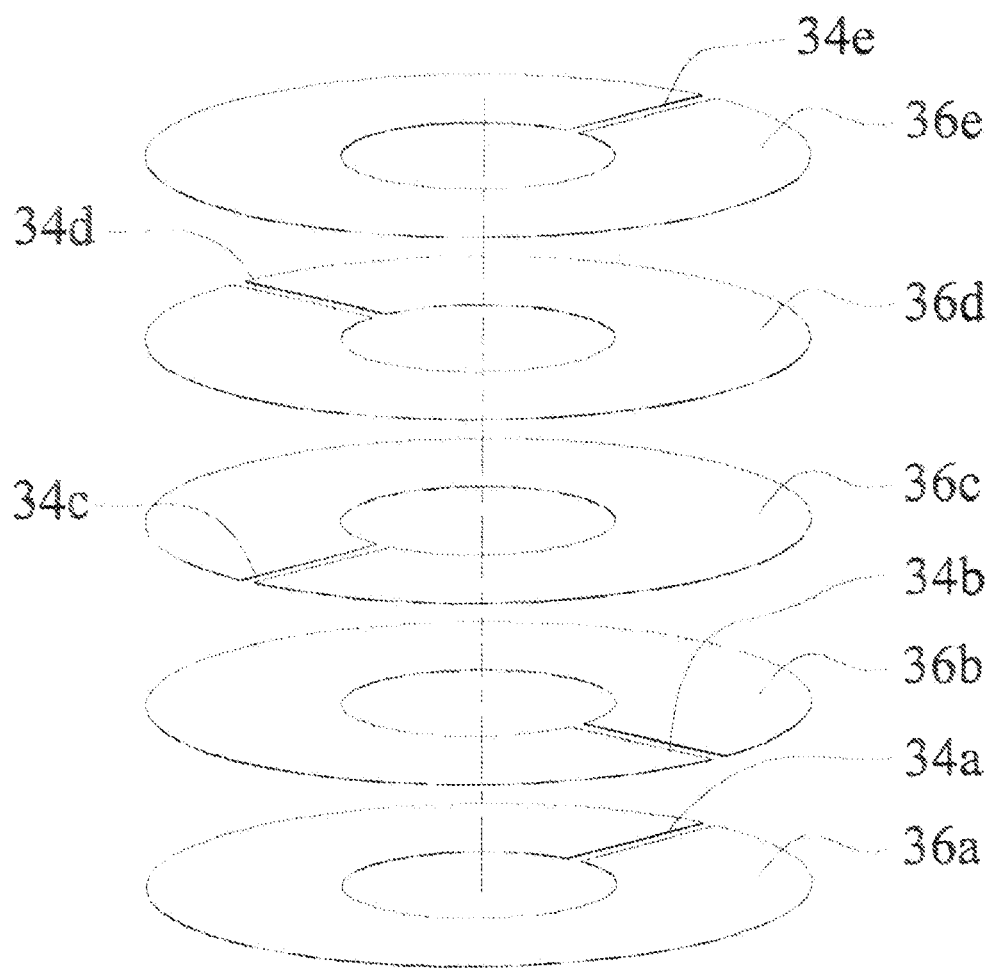
FIG. 8 shows an exploded view of the laminations of a laminated axial pole insert, each lamination including a slot rotated with respect to similar slots in the neighboring laminations.

The eddy currents in the axial poles 5 and 6 and the axial backiron 14 can be suppressed by suppressing their conductivities, at least in one direction, in the planes normal to the direction of the magnetic axial control flux 13. Thus, in the axial pole inserts 42 and 46, the conductivity is suppressed in the axial direction because of the insulation between laminations stacked in this direction. Similarly, in the axial backiron inserts 50, the insulation between laminations suppresses the conductivity in the tangential direction. As a result, the magnetic axial control flux 13 may be able to flow through the entire cross-sections of the inserts 42, 46, and 50 as shown in FIG. 5. The axial backiron inserts 50 may be lamination stacks stacked in a direction orthogonal to the rotational axis of the rotor The effectiveness of the axial pole inserts 42 and 46 can, optionally, be further improved by interrupting continuous current flow paths around the bearing axis 17 in each lamination. If this interruption is not done, the axial component of the time-varying axial magnetic control flux 13 encircled by the inserts 42 and 46 would induce circular currents in the inserts 42 and 46 flowing around the bearing axis 17 in accordance with Faraday's Law, which would negatively affect the bearing operation. FIG. 6 illustrates this principle using the axial pole insert 46 as an example. An axial component of a time-varying magnetic axial control flux 13 directed into the page in FIG. 6 induces a circular current 26 around the bearing axis 17 directed counterclockwise according to Faraday's Law. This current, in turn, induces a magnetic flux 28 opposing the original magnetic flux 13, and therefore, reducing a total flux injected into the axial air gap 8 and, consequently, the magnitude of the axial force 32. A radial slot 34 through the lamination stack such as shown in FIG. 7 may prevent the circular current 26. FIG. 7 shows views of an electromagnetic actuator according to the present disclosure and illustrates a manner of preventing a circular current in the laminated axial pole insert. It is also possible to introduce a radial slot in each lamination prior to stacking them and then rotate the position of the slot during the stacking as shown in FIG. 8 to achieve more uniform magnetic properties and mechanical strength of the laminated axial pole inserts 42 and 46 compared to FIG. 7. FIG. 8 shows an exploded view of the laminations of a laminated axial pole insert, each lamination including a slot rotated with respect to similar slots in the neighboring laminations.

Figure 9:
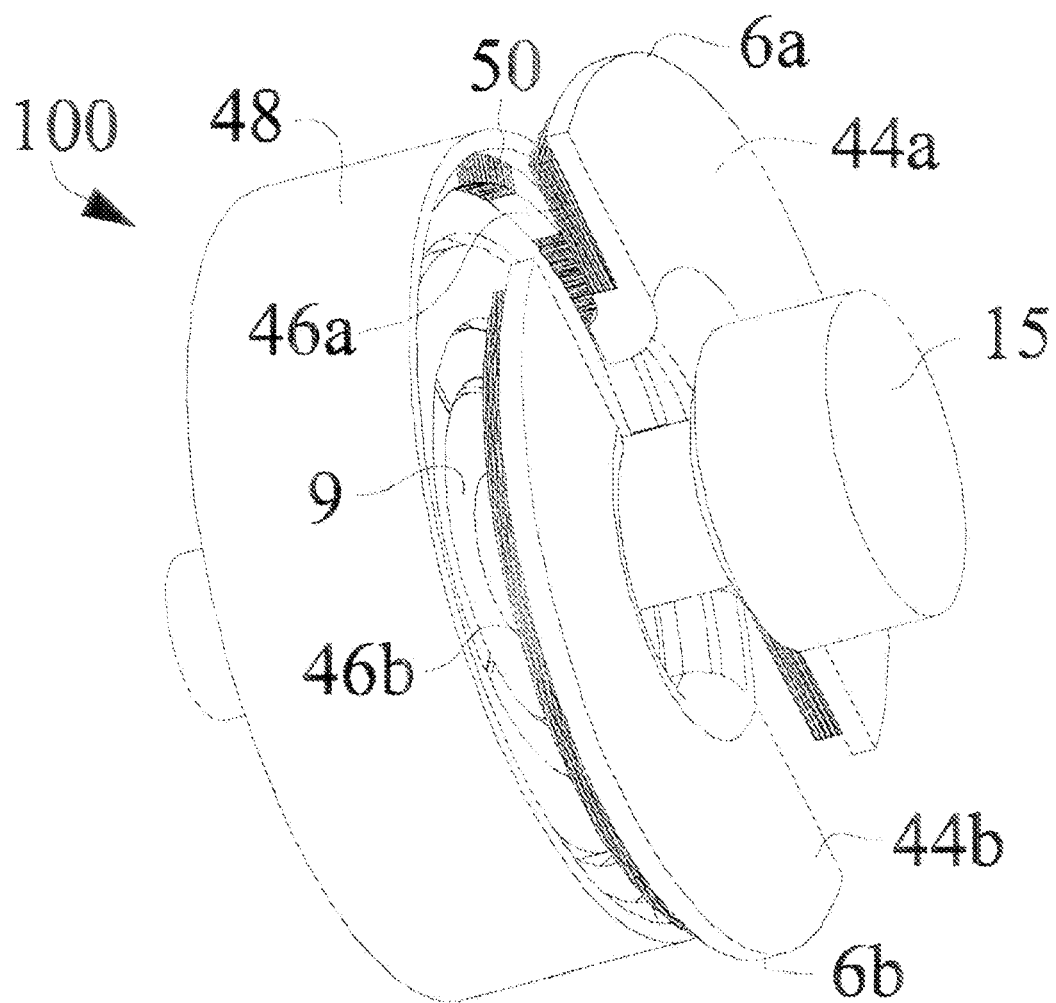
FIG. 9 shows an exploded view of an embodiment of a combination radial/axial electromagnetic actuator with an axial pole composed of separate segments.

In some cases, at least one of the axial poles 5 and 6 can be assembled out of individual segments. In particular, this may be helpful to facilitate the actuator assembly when the shaft 15 increases in diameter outwards from the actuator as illustrated in FIG. 9. FIG. 9 shows an exploded view of an embodiment of a combination radial/axial electromagnetic actuator with an axial pole composed of separate segments. In FIG. 9, the axial pole 6 is replaced with two 180-degree segments 6a and 6b, each including its own solid portion 44a and 44b, respectively, as well as a laminated insert 46a and 46b, respectively. The inserts 46a and 46b may be electrically isolated from each other to prevent forming a circular current such as current 26 in FIG. 6. For the same reason, the solid portions 44a and 44b may also be isolated from each other. During the assembly, the axial pole segments 6a and 6b can be slid radially into the gap between the actuator target 9 and a higher-diameter portion of the shaft 15 prior to attaching to the rest of the assembly.

It is also possible to use a common axial pole insert 46 such as the one shown in FIG. 1, 2, 6, 7 or 8 mechanically linking together segments of the axial pole solid portions, such as portions 44a and 44b shown in FIG. 9. This option may be especially attractive if the shaft 15 increases in diameter outwards from the actuator, as illustrated in FIG. 9, and the inner diameter of the axial pole insert 46 is larger than the outer diameter of the actuator target 9. In this case, during the assembly the solid axial pole segments 44a and 44b can be first slid radially into the gap between the actuator target 9 and a higher-diameter portion of the shaft 15, then a common axial pole insert 46 can be slid axially over the actuator target 9 and attached to the solid axial pole segments 44a and 44b forming axial pole 6, which later can be attached to the rest of the assembly.

Figure 10:
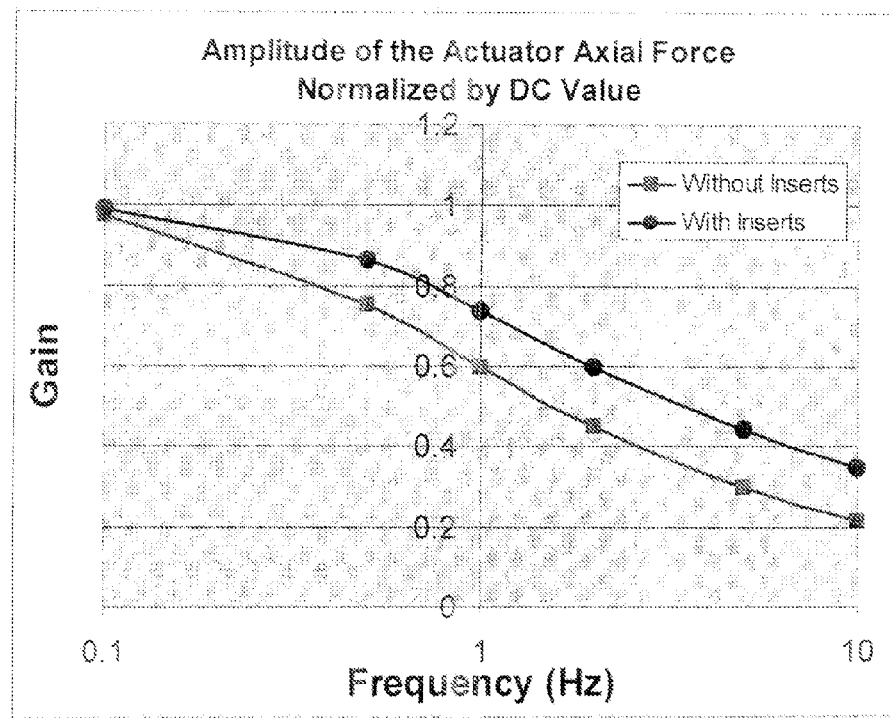
FIG. 10 is a graph showing an improvement in the axial AC gain of an example combination radial/axial actuator due to the usage of laminated axial pole inserts and laminated axial backiron inserts.
Figure 11:
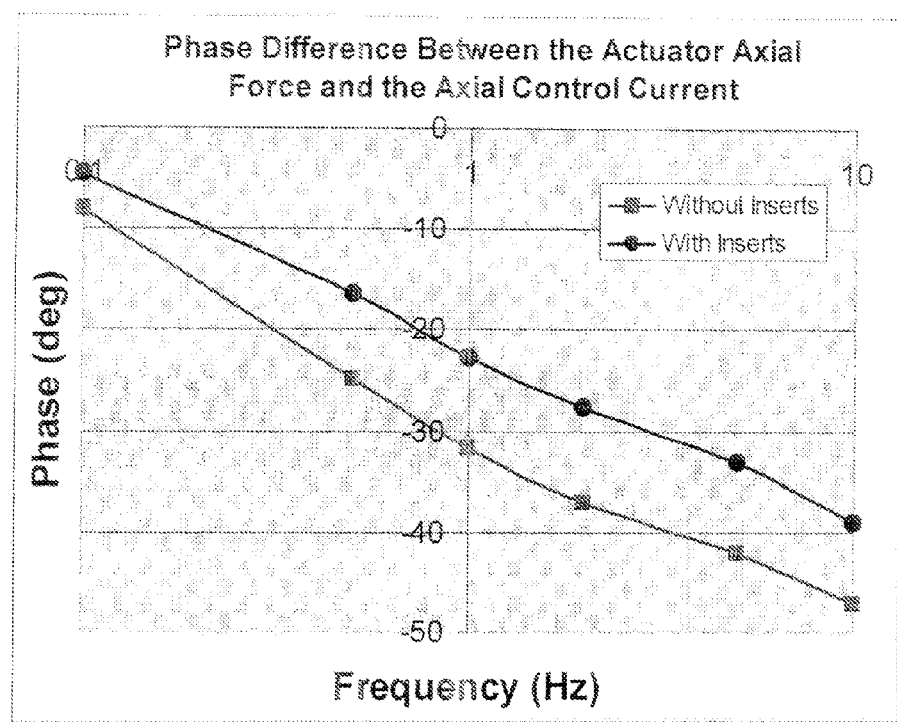
FIG. 11 is a graph showing an improvement in the phase difference between a force exerted by an example combination radial/axial actuator and an axial control current due to the usage of laminated axial pole inserts and laminated axial backiron inserts.

FIGS. 10 and 11 show improvements in the normalized actuator gain and phase lag, respectively, as functions of frequency that may be achieved by using laminated axial pole inserts and axial backiron inserts in an example combination actuator. The actuator axial gain is defined as a ratio of the amplitudes of the axial force 32 and an axial control current 30. The normalized axial actuator gain presented in FIG. 10 is a gain at a particular frequency divided by the gain at zero frequency (DC gain). The actuator phase lag presented in FIG. 11 is a difference between the phase of the axial force 32 and the phase of the axial control current 30. The remaining loss of the gain and phase lag are due to eddy currents in the actuator target 9 and tips of the solid portions 44 and 46 of the axial poles 5 and 6 adjacent to the target 9. Note that even though the target 9 is laminated in the Z direction, which is the direction of the magnetic axial control flux 13, it is not laminated in the plane normal to the direction of the magnetic axial control flux 13, and, therefore, eddy currents still can be induced in the target 9 and affect the distribution of the AC magnetic axial control flux 13.

FIGS. 1, 2, 6, 7, and 9 show the combination radial/axial electromagnetic actuator comprising several laminated inserts: two axial pole inserts 42 and 46 and a set of axial backiron inserts 50. It is also possible to use only some of the inserts shown in these figures, for example, only the axial pole inserts 42 and 46, or only one of the axial inserts 42 or 46, or only the axial backiron inserts 50, or any other combination of the inserts. The improvements to the actuator gain and phase, however, will be greater when a bigger portion of the path of the axial magnetic control flux 13 lies in laminated sections.

Figure 12:
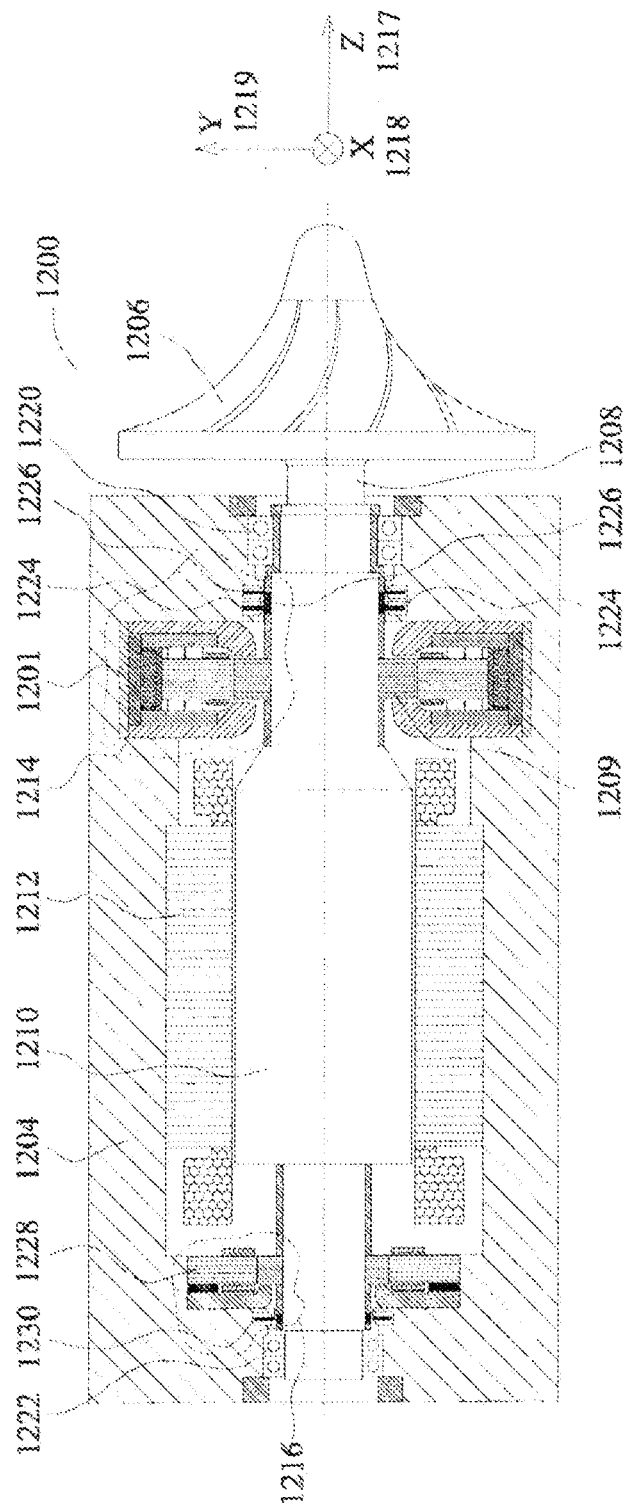
FIG. 12 is a cross-sectional schematic of an electric machine system incorporating an embodiment of the combination radial/axial electromagnetic actuator in accordance with the present disclosure.

In some aspects, the proposed homopolar combination axial/radial magnetic actuator 100 may be utilized as a part of an Active Magnetic Bearing (AMB) system to support a rotor of a rotational machine without a mechanical contact. FIG. 12 shows an example of using an AMB system in an electric rotational machine 1200. The rotational electric machine 1200 can be, for example, an electric compressor including an electric motor 1204 driving an impeller 1206 mounted directly on the motor shaft 1208. The electric motor 1204 shown in FIG. 12 has a rotor 1210 and a stator 1212. Alternatively, the impeller 1206 can be driven by a flow of gas or liquid and spin the rotor 1210 attached to it through the shaft 1208. In this case the motor 1204 can be used as a generator which would convert the mechanical energy of the rotor 1210 into electricity. In embodiments, the rotor 1210 of the electric machine 1200 can be supported radially and axially without mechanical contact by means of front and rear radial AMBs 1214 and 1216. The front AMB 1214 provides an axial suspension of the entire rotor 1210 and a radial suspension of the front end of the rotor, whereas the rear AMB 1216 provides only radial suspension of the rear end of the rotor 1210. When the AMBs 1214 and 1216 are not working, the rotor rests on the mechanical backup bearings 1220 and 1222. The front backup bearing 1220 may provide the axial support of the entire rotor 1210 and a radial support of the rotor front end, whereas the rear backup bearing 1222 may provide radial support of the rear end of the rotor 1210. There are sufficient radial clearances between the inner diameters of the mechanical backup bearings 1220, 1222 and the outer diameters of the rotor portions interfacing with those bearing to allow the rotor 1210 to be positioned radially without touching the backup bearings 1220, 1222 when the AMBs 1214 and 1216 are activated. Similarly, there are sufficient axial clearances between the backup bearings 1220, 1222 and the portions of the rotor 1210 interfacing with those bearings to allow the rotor 1210 to be positioned axially without touching the backup bearings 1220 and 1222 when the AMBs 1214 and 1216 are activated.

The front AMB 1214 consists of a combination radial and axial electromagnetic actuator 1201 per the concepts described herein, radial position sensors 1224, axial position sensor 1226 and control electronics (not shown). The electromagnetic actuator 1201 in accordance with the concepts described herein may be capable of exerting radial and axial forces on the actuator target 1209 firmly mounted on the rotor 1210. The axial force is the force in the direction of Z-axis 1217 and the radial forces are forces in the direction of X-axis 1218 (directed into the page) and the direction of Y-axis 1219. The actuator may have three sets of coils corresponding to each of the axes and the forces may be produced when the corresponding coils are energized with control currents produced by control electronics (not shown). The position of the front end of the rotor in space is constantly monitored by non-contact position sensors, such as radial position sensors 1224 and axial position sensors 1226. The non-contact position sensors 1224 can monitor the radial position of the rotor, whereas the position sensor 1226 monitors the axial position of the rotor.

Signals from the position sensors 1224 and 1226 may be input into the control electronics (not shown), which may generate currents in the control coils of the combination electromagnetic actuator 1201 when it finds that the rotor is deflected from the desired position such that these currents may produce forces pushing the rotor back to the desired position.

In certain instances, smaller axial gain attenuation with frequency and smaller phase difference between the actuator force and the control current in the combination electromagnetic actuator 1201 per the concepts described herein compared to conventional designs can result in a larger axial load capacity at any particular frequency and simplify control design.

The rear AMB 1216 consists of an electromagnetic actuator 1228, radial non-contact position sensors 1230, and control electronics (not shown). It may function similarly to the front AMB 1214 except that it might not be configured to control the axial position of the rotor 1210 because this function is already performed by the front AMB 1214. Correspondingly, the electromagnetic actuator 1228 may not be able to produce controllable axial force and there may be no axial position sensor The present disclosure describes embodiments of a combination axial/radial magnetic actuator. Other embodiments and advantages are recognizable by those of skill in the art by the forgoing description and the claims.

What is claimed is:

1. An electromagnetic actuator comprising:
a body having a rotational axis;
a first axial pole residing apart from the body, the first axial pole adjacent a first end facing surface of the body and adapted to communicate magnetic flux across a gap with the first end facing surface of the body;
a second axial pole residing apart from the body, the second axial pole adjacent a second end facing surface of the body and adapted to communicate magnetic flux with the second end facing surface of the body;
a first lamination stack comprising electrically isolated steel laminations stacked in a circumferential direction of the body;
an axial backiron; the body, the first axial pole, the second axial pole, the axial backiron, and the first lamination stack magnetically linked and defining an axial magnetic control circuit; and
a first radial pole residing apart from the body, the first radial pole adjacent a lateral facing surface of the body and adapted to communicate magnetic flux with the lateral facing surface of the body and at least one of the first axial pole or the second axial pole, the body, the first radial pole and the first axial pole or the second axial pole defining a magnetic bias circuit.

2. The electromagnetic actuator of claim 1 further comprising a second radial pole adjacent the lateral facing surface of the body and adapted to communicate the magnetic flux with the lateral facing surface of the body, the first radial pole and at least one of the first axial pole or the second axial pole; the body, the second radial pole and the first axial pole or the second axial pole defining the magnetic bias circuit; the body, the first radial pole and the second radial pole defining a radial magnetic control circuit.

3. The electromagnetic actuator of claim 2 further comprising a radial coil adapted to produce the magnetic flux in the radial magnetic control circuit.

4. The electromagnetic actuator of claim 3 wherein the magnetic fluxes entering the lateral facing surfaces of the body exert radial forces on the body.

5. The electromagnetic actuator of claim 4 wherein the radial forces are proportional to the magnetic fluxes in the radial magnetic control circuits.

6. The electromagnetic actuator of claim 4, wherein an isolated steel lamination includes a first edge that is substantially parallel to the rotational axis and a second edge that is orthogonal to the first edge and that is substantially parallel to a radius of the body.

7. The electromagnetic actuator of claim 1 wherein the end facing surface of the body is substantially orthogonal to the rotational axis.

8. The electromagnetic actuator of claim 1 wherein the body incorporates a magnetically permeable actuator target, the actuator target adapted to communicate the magnetic flux.

9. The electromagnetic actuator of claim 1 further comprising a magnetic element configured to produce magnetic bias flux in the magnetic bias circuit.

10. The electromagnetic actuator of claim 1 further comprising an axial coil adapted to produce the magnetic flux in the axial magnetic control circuit.

11. The electromagnetic actuator of claim 10 wherein the magnetic flux entering the first and second end facing surfaces of the body exerts an axial force on the body.

12. The electromagnetic actuator of claim 11 wherein the axial force is proportional to the magnetic flux in the axial magnetic control circuit.

13. The electromagnetic actuator of claim 1 wherein the first axial pole includes a first segment and a second segment.

14. The electromagnetic actuator of claim 13 wherein the first segment and the second segment are electrically isolated from each other.

15. The electromagnetic actuator of claim 13 wherein the first segment includes a first lamination segment and a second lamination segment, the first and second lamination segments defining the lamination stack.

16. The electromagnetic actuator of claim 15 wherein the first and the second lamination segments are electrically isolated from each other.

17. The electromagnetic actuator of claim 1, wherein the steel laminations are stacked in a direction tangential to a rotational direction of the body.

18. The electromagnetic actuator of claim 1, wherein a steel lamination in the first lamination stack is in a radial plane from the rotational axis.

19. The electromagnetic actuator of claim 18, wherein the steel lamination in the first lamination stack is rectangular with a long axis parallel to the rotational axis.

20. The electromagnetic actuator of claim 1 further comprising a second lamination stack comprising electrically isolated steel laminations stacked in a direction substantially parallel to the rotational axis, wherein the second lamination stack is rigidly affixed to one of the first axial pole or the second axial pole.

21. The electromagnetic actuator of claim 20 wherein the second lamination stack includes a first annular lamination and a second annular lamination, the first and second annular laminations defining an annular lamination stack substantially coaxial to the rotational axis.

22. The electromagnetic actuator of claim 21 wherein the first annular lamination is a first disjointed annular element defining a first air gap between disjoined segments of the first annular element and the second annular lamination is a second disjointed annular element defining a second air gap between disjoined segments of the second annular element.

23. The electromagnetic actuator of claim 22 wherein the first air gap resides misaligned from the second air gap in the annular lamination stack.

24. The electromagnetic actuator of claim 1, wherein the first lamination stack is rigidly affixed to the axial backiron.

25. The electromagnetic actuator of claim 1, wherein the first lamination stack is stacked in the circumferential direction to decrease eddy current in the axial magnetic control circuit.

26. A method for exerting a time-varying force on a body along a body axis, the method comprising:
communicating a first bias magnetic flux through a first axial facing surface of the body;
communicating a second bias magnetic flux through a second axial facing surface of the body;
generating a time-varying axial control magnetic flux;
directing the time-varying axial control magnetic flux towards the first and the second axial facing surfaces of the body in a stationary magnetic control circuit, the stationary magnetic control circuit including at least one electrically isolated steel lamination stack stacked in a circumferential direction around the body axis, wherein the stationary magnetic circuit further includes magnetically-permeable electrically-isolated laminations stacked in a direction substantially parallel to the body axis; and
communicating the time-varying axial control magnetic flux through the first and the second axial facing surfaces of the body.

27. The method of claim 26, wherein the time-varying axial control magnetic flux is generated by a time-varying current in a conductive coil wound around the body.

28. An electric machine system comprising:
a stator;
a rotor having a rotational axis configured to move relative to the stator;
an electromagnetic actuator subassembly comprising:
a cylindrical actuator target rigidly mounted on the rotor,
a first axial pole residing apart from the actuator target, the first axial pole adjacent a first end facing surface of the actuator target and adapted to communicate magnetic flux across a gap with the first end facing surface of the actuator target,
a second axial pole residing apart from the body, the second axial pole adjacent a second end facing surface of the body and adapted to communicate magnetic flux with the second end facing surface of the body,
an axial backiron magnetically linking the first axial pole and the second axial pole,
a first lamination stack comprising electrically isolated steel laminations stacked in a circumferential direction about the rotational axis, the body, the first axial pole, the second axial pole, the first lamination stack, and the axial backiron magnetically linked and defining an axial magnetic control circuit,
a second lamination stack comprising electrically isolated steel laminations stacked in a direction substantially parallel to the rotational axis, wherein the second lamination stack is rigidly affixed to one of the first axial pole or the second axial pole, and wherein the first lamination stack is rigidly affixed to the axial backiron,
an axial control conductive coil adapted to produce a magnetic flux in the axial magnetic control circuit,
a plurality of radial poles residing apart from the body, the plurality of radial poles adjacent a lateral facing surface of the body and adapted to communicate magnetic fluxes with the lateral facing surface of the body, the body and the plurality of radial poles defining a plurality of radial magnetic control circuits, the plurality of radial poles adapted to communicate magnetic fluxes with the lateral facing surface of the body and at least one of the first axial pole or the second axial pole, the body, the plurality of radial poles and at least one of the first axial pole or the second axial pole defining a magnetic bias circuit, and
radial control conductive coils wound around the radial poles and adapted to produce the magnetic flux in the radial magnetic control circuits;
one or more position sensors configured to sense a position of the body; and at least one control electronics package configured to control the magnetic fluxes in the axial magnetic control circuit and the radial magnetic control circuits.

29. The electric machine system of claim 28 wherein the body is coupled to a driven load, the driven load comprising at least one of a flywheel, a compressor, a generator, or an expander.

30. The electric machine system of claim 29 wherein the body is coupled to a driver, the driver comprising at least one of a motor, an engine, or a turbine.

31. The electric machine system of claim 28 wherein the at least one electronic control package is configured to control the magnetic fluxes in the axial and radial magnetic control circuits by energizing axial and radial control conductive coil with control currents.

32. The electric machine system of claim 31 wherein the magnetic fluxes exert electromagnetic forces on the actuator target.

33. The electric machine system of claim 32 wherein the electronic control package is further configured to energize the axial and radial control conductive coil with control currents in response to changes of signals from the position sensors so that the rotor is supported by electromagnetic forces without a mechanical contact with the stator.

* * * * *